US009156022B2

(12) United States Patent
Koranne et al.

(10) Patent No.: US 9,156,022 B2
(45) Date of Patent: Oct. 13, 2015

(54) ATTRITION RESISTANT SUPPORTS FOR FISCHER-TROPSCH CATALYST AND PROCESS FOR MAKING SAME

(75) Inventors: Manoj M. Koranne, Clarksville, MD (US); Erling Rytter, Trondheim (NO); Sigrid Eri, Ranheim (NO); Oyvind Borg, Trondheim (NO)

(73) Assignee: W. R. GRACE & CO.-CONN., Columbia, MD (US)

( * ) Notice: Subject to any disclaimer, the term of this patent is extended or adjusted under 35 U.S.C. 154(b) by 0 days.

(21) Appl. No.: 13/816,054

(22) PCT Filed: Jul. 19, 2011

(86) PCT No.: PCT/US2011/044421
§ 371 (c)(1),
(2), (4) Date: Feb. 8, 2013

(87) PCT Pub. No.: WO2012/021259
PCT Pub. Date: Feb. 16, 2012

(65) Prior Publication Data
US 2013/0143736 A1   Jun. 6, 2013

Related U.S. Application Data

(60) Provisional application No. 61/371,905, filed on Aug. 9, 2010.

(51) Int. Cl.
| | |
|---|---|
| *B01J 23/00* | (2006.01) |
| *B01J 21/04* | (2006.01) |
| *B01J 23/06* | (2006.01) |
| *B01J 23/755* | (2006.01) |
| *B01J 35/10* | (2006.01) |
| *B01J 37/00* | (2006.01) |
| *B01J 37/02* | (2006.01) |
| *C10G 2/00* | (2006.01) |

(52) U.S. Cl.
CPC ............... *B01J 23/005* (2013.01); *B01J 21/04* (2013.01); *B01J 23/06* (2013.01); *B01J 23/755* (2013.01); *B01J 35/1019* (2013.01); *B01J 35/1038* (2013.01); *B01J 35/1042* (2013.01); *B01J 35/1047* (2013.01); *B01J 37/0045* (2013.01); *B01J 37/0201* (2013.01); *C10G 2/33* (2013.01); *C10G 2/334* (2013.01)

(58) Field of Classification Search
None
See application file for complete search history.

(56) References Cited

U.S. PATENT DOCUMENTS

| | | | |
|---|---|---|---|
| 3,669,904 A | 6/1972 | Cornelius et al. ............. 252/465 |
| 4,273,735 A | 6/1981 | Jacques et al. .................... 264/5 |
| 4,952,389 A | 8/1990 | Szymanski et al. ............ 423/625 |
| 5,591,418 A | 1/1997 | Bhattacharyya ........... 423/239.1 |
| 5,750,020 A | 5/1998 | Bhattacharyya et al. ...... 208/113 |
| 6,218,335 B1 | 4/2001 | Okada et al. ................... 502/340 |
| 6,262,132 B1 | 7/2001 | Singleton et al. ............. 518/715 |
| 6,271,432 B2 | 8/2001 | Singleton et al. ............. 585/700 |
| 6,403,526 B1 | 6/2002 | Lussier et al. ................. 502/439 |
| 6,465,530 B2 | 10/2002 | Roy-Auberger et al. ..... 518/715 |
| 6,537,945 B2 | 3/2003 | Singleton et al. ............. 502/327 |
| 6,740,621 B2 | 5/2004 | Singleton et al. ............. 502/429 |
| 6,858,132 B2 | 2/2005 | Kumagai et al. .............. 208/216 |
| 7,011,809 B2 | 3/2006 | Singleton et al. | |
| 7,071,239 B2 | 7/2006 | Ortego, Jr. et al. ............ 518/715 |
| 7,090,824 B2 | 8/2006 | Pinnavaia et al. ............. 423/625 |
| 7,163,963 B2 | 1/2007 | Fraenkel ........................ 518/715 |
| 7,176,160 B2 | 2/2007 | Espinoza et al. ............. 502/327 |
| 7,214,642 B2 | 5/2007 | McDaniel et al. ............ 502/217 |
| 7,253,136 B2 | 8/2007 | Mauldin et al. ............... 502/327 |
| 7,262,225 B2 | 8/2007 | Van Berge et al. ............ 518/715 |
| 7,276,540 B2 | 10/2007 | Espinoza et al. ............. 518/715 |
| 7,341,976 B2 | 3/2008 | Espinoza et al. ............. 502/327 |
| 7,348,293 B2 | 3/2008 | Timken ........................ 502/327 |
| 7,351,679 B2 | 4/2008 | Eri et al. ........................ 502/327 |
| 7,361,626 B2 | 4/2008 | Baijense et al. .............. 502/329 |
| 7,402,612 B2 | 7/2008 | Jin et al. ........................ 518/713 |
| 7,417,073 B2 | 8/2008 | Mauldin et al. ............... 518/715 |
| 7,560,412 B2 | 7/2009 | Osbourne et al. ............. 502/327 |

(Continued)

FOREIGN PATENT DOCUMENTS

WO     2005072866     8/2005    ............... B01J 23/75

OTHER PUBLICATIONS

Miroslaw Zawadzki, "Synthesis of nanosized and microporous zinc aluminate spinel by microwave assisted hydrothermal method (microwave hydrothermal synthesis of ZnAl2O4)", Solid State Sciences 8 (2006) 14-18.

(Continued)

*Primary Examiner* — Steven Bos
(74) *Attorney, Agent, or Firm* — Charles A. Cross

(57) ABSTRACT

The invention relates to a novel method of preparing attrition resistance spinel supports for Fischer Tropsch catalysts. The process comprises: (a) combining aluminum oxide, metal compound capable of forming spinel phase, and soluble compound of a trivalent aluminum; (b) mixing the combination resulting in (a) in a manner sufficient to form a slurry comprising the aforementioned combination; and (c) processing the mixture of (b) under conditions sufficient to form metal aluminate spinel composition. Metal aluminate spinel, for example, is formed in the last step by calcining the mixture from (b) at a temperature in the range of 700 to 1300° C., but the process is also capable, of producing attrition resistant supports (e.g., having a DI of 5 or less) at a relatively lower temperature in the range of 700 to 1050° C. The invention also produces the attrition resistance with lower metal loadings than that reported for prior attrition resistant spinel supports.

22 Claims, 1 Drawing Sheet

(56) References Cited

U.S. PATENT DOCUMENTS

| | | | |
|---|---|---|---|
| 2004/0127352 A1 | 7/2004 | Jin et al. | 502/332 |
| 2005/0135995 A1 | 6/2005 | Wang | 423/625 |
| 2006/0120952 A1 | 6/2006 | Pinnavaia et al. | 423/628 |
| 2007/0161714 A1 | 7/2007 | Rytter et al. | 518/718 |
| 2008/0039539 A1 | 2/2008 | Espinoza et al. | 518/716 |
| 2008/0193369 A1 | 8/2008 | Barclay et al. | |
| 2009/0124496 A1 | 5/2009 | Niesen et al. | 502/439 |
| 2010/0099780 A1 | 4/2010 | Rytter et al. | 518/700 |
| 2013/0199966 A1* | 8/2013 | Koranne et al. | 208/107 |

OTHER PUBLICATIONS

Wei et al., "Synthesis and characterization of nanosized zinc aluminate spinel by sol-gel technique", Materials Letters 60 (2006) 823-827.

Wrzyszcz et al., "Some catalytic properties of hydrothermally synthesised zinc aluminate spinel", Applied Catalysis A: General 210 (2001): 263-269.

International Search Report and Written Opinion dated Dec. 14, 2011 on PCT Application No. PCT/US11/44421.

* cited by examiner

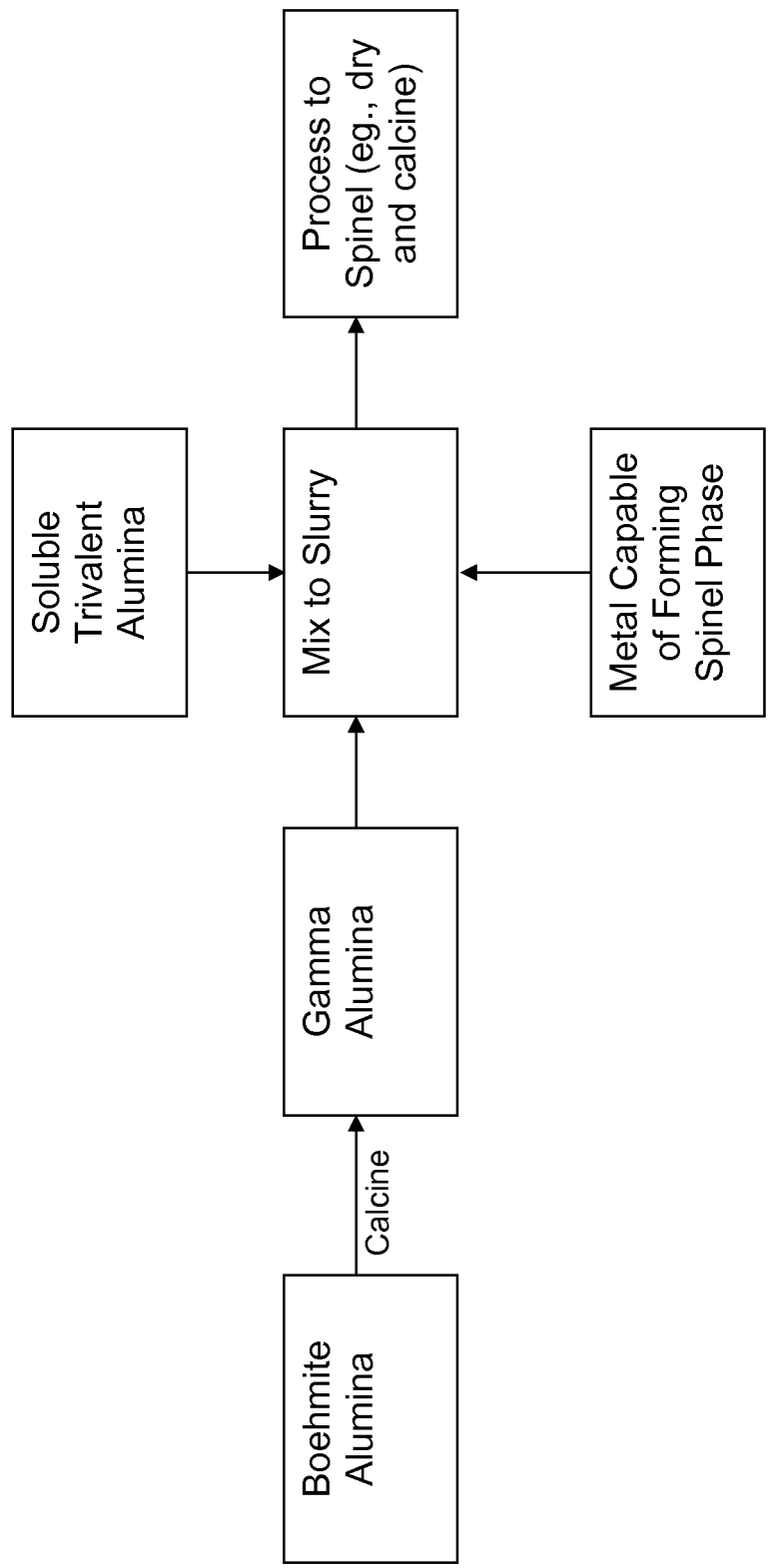

ATTRITION RESISTANT SUPPORTS FOR FISCHER-TROPSCH CATALYST AND PROCESS FOR MAKING SAME

RELATED APPLICATIONS

This application claims priority and the benefit of the filing date of International patent application Ser. No. PCT/US2011/044421 filed Jul. 19, 2011, which claims priority and the benefit of the filing date of U.S. Provisional Patent Application No. 61/371905 filed Aug. 9, 2010, the disclosure of which is hereby incorporated herein by reference. This application discloses and claims inventions that were made during, and as result of activities undertaken within the scope of, a joint research agreement by or on behalf of W.R. Grace & Co.-Conn. and Statiol GTL AS.

FIELD OF THE INVENTION

This invention relates to attrition resistant supports for use in catalysts for Fischer Tropsch synthesis, and processes for manufacturing the supports from aluminum oxide compounds.

BACKGROUND

The Fischer-Tropsch (FT) process (or Fischer-Tropsch synthesis) is a catalyzed chemical reaction in which synthesis gas (a mixture of carbon monoxide and hydrogen) is converted into liquid hydrocarbons. A variety of catalysts have been used for the FT process, but the most common active metals are based on cobalt or iron. In addition, to the active metals, noble metal promoters such as ruthenium or rhenium are added to enhance activity/selectivity of the active ingredient. Typically, the active metal and the promoters are supported on alumina, silica or titania.

The FT process can be carried out either in a fixed bed reactor or a slurry bed reactor. In case of a slurry bed process, the catalyst particles are suspended in oil with gaseous reactants being bubbled into the reactor. For either process to be economically viable, the catalyst must exhibit good performance for a long period of time without significant loss in catalytic activity. Typically, catalyst deactivates because of one or more of the following issues: (a) poisoning of the active catalytic metal (e.g., cobalt), (b) loss of catalytic metal surface area (e.g., via sintering), (c) loss of active metal species due to reaction with support, and (d) attrition.

The attrition of the catalyst, i.e., issue (d) above, is primarily dependent on the strength of the support for the catalytically active metal. Using slurry bed catalyst as an example regarding the attrition issue, the particles in these catalysts are subjected to a number of collisions either with other particles or with the reactor walls. This causes the catalyst particles to "attrit" or break into smaller particles. Smaller particles are not retained in the reactor, and as a result the activity declines absent continuous addition of fresh catalyst. In order to enhance performance of the catalyst and to improve the catalyst life, a support must therefore exhibit high attrition resistance.

High surface area alumina is commonly used as a catalyst support for FT. Supports having high surface area provide the necessary support surface for dispersing catalytic sites throughout the catalyst. High surface area aluminas are conventionally prepared by calcining an aluminum hydroxide composition such as boehmite. Calcined, high surface area alumina per se, however, does not exhibit good attrition resistance. Indeed, it is also largely believed that aluminas after calcination cannot be easily bound into hard particles. Hence there is a tendency to use boehmitic aluminas as support precursors, which are slurried in water and "peptized" in the presence of an acid such as nitric or hydrochloric acid, followed by drying and calcinations to give attrition resistant particles. This alternative presents its own problem because these peptized boehmitic aluminas slurries gel at high solids content and need to diluted before drying and calcination. Processing the alumina at high solids content is desirable not only to get high production rates, but also to yield a strong particle of desired particle size upon spray drying.

In addition, and as referenced with respect to issue (c) above, high surface area alumina supports react with active metal precursor of cobalt to form Co-aluminate spinel upon calcination. This transforms the active Co metal to "inactive" spinel Co-aluminate and thus decreases the catalyst activity.

In order to prevent Co-aluminate spinel formation, divalent metals like Ni, Zn, and Mg can be added to an alumina support to form the spinel phase "a priori" and thus prevent the formation of inactive Co-aluminate. The divalent metal aluminate spinels are formed upon high temperature calcinations above 650° C. Such spinel materials do not exhibit high strength, however, and can easily break into smaller particles. In other words, such spinel phase-based particles generally do not have sufficient attrition resistance.

It has been shown that if the spinel compositions are calcined at very high temperatures, in excess of 1100° C., the attrition resistance improves significantly (see WO 2005/072866 A1 or US 2007/0161714). In addition to requiring high calcination temperatures, it is also apparent that high levels of divalent metals are needed to attain the good attrition resistance. Typically, the divalent compound is in excess of 10 wt % (as metal) in loading.

It has also been shown that, as a result of high temperature calcinations, the support pore diameter shifts to higher pore modes. Catalysts made from these high temperature calcined spinel supports therefore have high selectivity to higher hydrocarbons in addition to the aforementioned attrition resistance. The practical use of these supports, however, is limited due to expensive processing steps, and large amounts of expensive divalent metal compounds added as dopants. Furthermore, large amount of divalent dopant compounds poses the risk of leaching out of the spinel structure and adversely affecting the catalyst activity.

The object of this invention therefore is to provide catalysts with improved attrition resistant metal aluminate spinel supports made at relatively low temperatures and preferably using relatively low levels of divalent metals.

SUMMARY OF THE INVENTION

The invention comprises a novel method that achieves a support having the attrition resistance and other beneficial attributes of spinel supports. The process comprises:
  (a) combining aluminum oxide, metal compound capable of forming spinel phase, and soluble compound of a trivalent aluminum (i.e., also referred to herein as $Al^{3+}$);
  (b) mixing the combination resulting in (a) in a manner sufficient to form a slurry comprising the aforementioned combination; and
  (c) processing the mixture of (b) under conditions sufficient to form metal aluminate spinel composition.

Metal aluminate spinel, for example, can be formed in the last step by calcining the mixture from (b) at a temperature in the range of 700 to 1300° C. The process is capable, however, of also producing attrition resistant supports (e.g., having an attrition index (DI) of 4 or less) at a relatively lower temperature in the range of 700 to 1050° C.

Another feature of the process is employing gamma alumina as the aluminum oxide, especially a gamma alumina that is prepared by heating boehmite alumina at a temperature sufficient to convert boehmite alumina to gamma alumina, e.g., at a temperature in the range of 400° C. to 700° C.

A soluble salt of a metal (other than aluminum) capable of forming spinel phase, or a salt from a mixture of such metals, is particularly suitable for use in this invention. Suitable salts are those of metals such as zinc, nickel, and magnesium. Nitrate salts are particularly suitable for use in various embodiments of this invention. The metal compounds capable of forming spinel phases can be added in an amount in the range of 2 to 20% by weight, but can be in the range of 3 to 10% by weight, thereby utilizing smaller amounts of metals to manufacture a sufficiently attrition resistant support.

The feature of the invention comprising trivalent aluminum can be a soluble binder, e.g., such as aluminum nitrate, aluminum chlorohydrol, aluminum chloride and aluminum sulfate. Without being held to a particular theory, it is believed that mixing this soluble component in combination with the other two components results in enhanced binding and attrition resistance compared to past metal aluminate spinel supports. The trivalent aluminum is particularly suitable and desirable for use in embodiments of the invention that utilize calcined transition alumina, such as the aluminum oxide, e.g., gamma alumina from calcined boehmite, delta alumina, theta alumina, eta alumina, and mixtures thereof.

Mixing the aforementioned three components in (a) into a slurry is particularly suitable, and it is especially suitable if the components are intimately mixed into a well dispersed slurry.

Further processing and mixing the aforementioned components in a mill, wherein the mixing reduces the particle size of solids in the mixture to a median particle size that is less than ten microns is a particularly useful feature of the invention. It is especially useful that the milling be conducted with a well dispersed slurry of the aforementioned three components.

The processing in (c) also usually comprises drying the mixture of (b) at a temperature in the range of 100 to 400° C. prior to forming the spinel composition. The drying preferably is in a spray dryer to prepare microspheric particles of a size sufficient for a FT catalyst support, e.g., an average particle size in the range of 20 to 100 microns. The dried product is then calcined as described above.

The resulting product comprises metal aluminate spinel phase (e.g., also referred to herein as a metal aluminate composition) wherein the metal of the spinel depends on the metal compound employed in (a). The support also typically comprises recognizable amounts of alpha alumina that depend on the degree of calcination.

The supports made by the method described here also have the advantage of having high pore diameters associated with calcined supports, which result in high selectivity to higher hydrocarbons.

The high attrition resistance of the supports made by this process therefore enables high activity to be maintained without the continuous addition of catalysts. At the same time, the presence of spinel and alpha alumina phases render the support inactive towards the reaction with active metals like cobalt, thus improving the catalyst effectiveness.

BRIEF DESCRIPTION OF THE DRAWINGS

The FIGURE is a schematic illustration of the invention utilizing an embodiment in which the aluminum oxide is a gamma alumina prepared via calcination of boehmite alumina.

DETAILED DESCRIPTION

Metal Aluminate Spinel

The term "metal aluminate spinel" in the context of this invention refers to the conventional definition of a spinel phase, i.e., a crystal structure possessing double oxides having a formula of $AB_2O_4$, wherein A and B represent a metal element. The spinel of this invention is an aluminate spinel, and therefore metal B is trivalent Al. Metal A varies and depends on the metal compound described below. Spinel structures are crystalline, and possess an octahedral profile that belongs to a closely packed, oxygen-containing cubic lattice of $AB_2O_4$ as the lattice unit. The metal aluminate spinel of this invention is believed to result from the aluminum oxide and soluble metal compound capable of forming spinel phase.

Aluminum Oxide and Alumina

The term aluminum oxide and alumina are used herein to not only include those compositions of $Al_2O_3$, but also aluminum and oxygen-containing hydrous compositions such as aluminum hydroxide, and aluminum oxyhydroxide The aluminum oxide is believed to be a precursor for the aluminate of the metal spinel when calcined in the presence of a soluble metal. The aluminum oxide is insoluble and added as a powder, or other solid form suitable for forming aluminate when calcined in the presence of the soluble metal source.

Suitable examples of aluminum oxide include, without being limited to, transitional aluminas, and crystalline hydrous alumina, such as crystalline aluminum hydroxide. Suitable transition aluminas include gamma-alumina; eta-alumina; delta alumina; theta-alumina, rho-alumina, and any combinations of two or more thereof. These aluminas are also known as anhydrous aluminas. Suitable crystalline aluminum hydroxides include precursors to metastable forms of transition aluminas, such as gibbsite, bayerite, nordstrandite, and tohdite. Gibbsite ($Al(OH)_3$), bayerite (a polymorph of gibbsite), and nordstrandidte are crystalline forms of aluminum trihydroxide. Suitable aluminum oxyhydroxides include diaspore and boehmite (AlOOH).

Gamma alumina is a particularly suitable aluminum oxide suitable for use in various embodiments of this invention. Gamma alumina can be prepared by converting boehmite alumina to gamma alumina by calcining boehmite to a temperature of at least 350° C., and more typically in the range of 400 to 700° C. Desired calcinations can be achieved in a stationary muffle furnace or a rotary furnace.

In the case of a muffle furnace, the boehmite alumina is heated at a temperature in the above range for a period of from about 15 minutes to about 24 hours (more preferably from about 30 minutes to about 8 hours and most preferably about 2 hours). Examples of commercially-supplied boehmite materials suitable for forming gamma alumina supports include CATAPAL and PURAL aluminas supplied by Sasol (formerly Condea/Vista). See U.S. Pat. No. 7,011,809.

It is particularly advantageous in later processing to utilize gamma alumina, or to convert boehmite to gamma alumina to be the aluminum oxide. Using gamma alumina enables the solids in subsequent processing steps, e.g., in a dryer, to be relatively high (>20 wt %). Processing the aluminum oxide composition at high solids is desirable not only to attain high production rates, but also to yield a strong particle of a desired particle size upon spray drying. Typically about 25-30% solids can be used in this process when aluminum oxide is gamma alumina.

The aluminum oxide is typically in powder form having an average particle size in the range of 10 to 100 microns. The surface area and pore volume of the aluminum oxide can vary, and these parameters will dictate the surface area and porosity of the final support. By way of example, the aluminum oxide can have a surface area in the range of 100 to 400 m$^2$/g and pore volume in the range of 0.2 to 1.2 cc/g.

The aluminum oxide may be optionally washed, especially if the aluminum oxide is prepared from sources containing impurities, such as sulfur, alkali metal and other metallic species such as calcium. The aluminum oxide can be washed in deionized aqueous baths at a temperature ranging from room temperature (25° C.) to 100° C. Washing is typically carried out with baths in a temperature in the range of 50 to 70° C. When performed, it is preferable to wash the aluminum oxide prior to further processing the aluminum oxide with the soluble metal and other components. Alternatively, it is also possible to perform washing for removal of impurities after processing the aluminum oxide with the other components described below, but before forming a spinel.

Metal Capable of Forming Spinel Phase

Generally, suitable metal compounds capable of forming spinel phase are those compounds of metal capable of forming a metal aluminate spinel, and therefore include those of divalent (+2) metals. Suitable metals include, but are not limited to, those +2 valence metals listed in Group IIA of the periodic table including beryllium, magnesium, calcium, strontium, barium and radium, those of Group IIB of the periodic table including zinc, cadmium and mercury and transition metals including chromium, manganese, iron, cobalt, nickel and copper. Particularly suitable metals include zinc and/or nickel.

The metal compound chosen above acts to form spinel phase once it is combined and processed with the aluminum oxide described above under conditions described later below.

Suitable compounds containing the metal are typically soluble in the medium employed to combine and mix the metal source with aluminum oxide and the trivalent aluminum compound described below. The compound is preferably a salt derived from either mineral acids, or organic acids, with nitrate, chloride, and acetate salts being particularly suitable for aqueous based mediums. Notwithstanding, the components, including the metal compound capable of forming spinel phase, can be combined in organic solvents such as acetone, methanol, ethanol, dimethyl formamide, diethyl ether, cyclohexane, xylene, and tetrahydrofuran.

Soluble Trivalent Aluminum Compound

The soluble Al$^{3+}$ compound is one that is soluble in the medium chosen to combine and mix the aforementioned components, and should be in a form that, when mixed with the other components, does not cause significant gelling, e.g., reacts with the above components or interacts with the mixing medium. Choosing a soluble compound, compared to, e.g., solid particulate binders, enhances the ability of the compound to intimately mix it with the other components, and especially when the other components are dispersed in a slurry. The compound can therefore vary depending on the desired properties of the final support and the properties of the components selected to form the metal aluminate spinel. Ionic compounds containing trivalent Al are particularly suitable, and include aluminum nitrate, aluminum chlorohydrol, aluminum chloride, aluminum sulfate. Such ionic compounds can be very effective in binding particles which are non-peptizable, but possess desirable physical properties (e.g. surface area, pore volume, and crystallite size).

A particularly suitable soluble trivalent Al compound is aluminum nitrate, although aluminum sulfate, aluminum chloride can be used as effectively. Typical loading of the compound is in the range of 2 to 20 wt %, and will typically be around 10 wt % on an total alumina basis in the mixture. Lower loadings of 5% are also effective, with amounts as low as 3% or less possible with a combination of mineral or organic acid additives, and the solids content is such that gelling is not likely to occur.

Without being held to a particular theory, it is believed the soluble Al$^{3+}$ compound is a binder precursor that serves to form a binder in the metal aluminate spinel composition because its addition to components (1) and (2) serves to enhance the final composition's attrition resistance. The solubility of the compound permits extensive dispersion when the components are mixed into a well dispersed slurry and contact with the aluminum oxide when being mixed, as well as contact with the spinel as the spinel is formed. Once the subsequent processing is completed, e.g., dried and then calcined, to form a final spinel support, it is believed aluminum nitrate has converted (e.g., been decomposed) to an alumina species that binds the metal aluminate spinel (and any transition alumina or other chemical species present) to form an attrition resistant catalyst support.

It is envisioned that other components can be included in the process to act as binder for the aluminate spinel composition. The description herein shall also not be construed to mean that all of the trivalent aluminum compound acts as or converts to binder.

The (1) aluminum oxide, (2) the metal compound capable of forming spinel phase, and (3) soluble trivalent aluminum compound are added to a suitable medium at room temperature that can be later mixed, preferably under intimate mixing conditions, and processed to reduce particle size of solids present. The components can be added in any order, at a temperature in a range of 0 to 100° C. It is preferable the temperature is sufficient for the soluble components (b) and (c) to be dissolved in the medium. As mentioned above, the medium can be aqueous based, or other media such as the organic media mentioned earlier can be used. In an embodiment in which (1) comprises gamma alumina prepared from calcination of boehmite, components, (2) and (3) can be directly added to an aqueous slurry of the gamma alumina after calcining the boehmite alumina.

The relative weight proportions of components (1), (2) and (3) added to the medium typically are in the range of 65 to 95 wt % as oxide (1), 2 to 20 wt % as oxide (2) and 3 to 15 wt % as oxide (3).

The pH of the medium containing the three components is less than 5.

Each of the components (1) and (2) may comprise two or more species of the component. For example, a mixture of two different aluminum oxides, and/or a mixture of two different metal compounds may be employed to produce a spinel composition comprising two different metal aluminate spinels. While not typical, it may be desirable to utilize two or more different soluble trivalent aluminum compounds.

There may also be included optional components in addition to (1), (2), and (3). These optional components can include textural promoters, e.g., lanthana, silica, clay, phosphorus, and the like.

Mixing

Once combined in an appropriate medium, the aluminum oxide, metal compound capable of forming spinel phase, and trivalent aluminum compound are mixed under conditions sufficient to disperse the components, preferably under conditions sufficient to form a slurry. Certain embodiments comprise mixing the components into a well dispersed slurry in order to maximize contact of the components with one another. A "well dispersed slurry" can be defined in this context as one in which the solids in the slurry, e.g., aluminum oxide, do not readily settle, e.g., the solids would stay in dispersion for at least fifteen minutes to an hour before significant amounts of the solids settle. The dispersion can be carried out at room temperature or higher, e.g., room temperature to 100° C. The mixing is such that the components are intimately mixed and can be conducted in a conventional mixer. Without being held to a particular theory, it is believed that forming a slurry of the aluminum oxide and metal compound capable for forming spinel phase, one can add other components, e.g., such as the soluble compound of a trivalent Al, and create a medium that is more readily conducive to reactions and/or interaction of the spinel forming components with the additional components.

The mixing is also conducted under conditions such that no significant gelling occurs, while at the same time achieving a mixture having relatively high solids going into the processing steps that form the catalyst support and convert the mixture to a metal aluminate spinel composition. Indeed, as mentioned above, it is possible and desirable to produce a mixture having at least 20% by weight solids, and more desirable to attain about 25 to 30% solids. Such solids levels are especially achievable when selecting a calcined alumina as the aluminum oxide. It has been shown that gamma alumina produced from calcining boehmite alumina provides a high solids slurry during mixing. It is believed that higher solids tend to produce a more attrition resistant support, and with minimum gelling, the process effectively disperses the trivalent Al and results in a less viscous feed to a dryer.

Once the components are mixed, the particle size of the solids, e.g, aluminum oxide, can be reduced to a median particle size below 10 microns, preferably in a range of 1 to 5 microns. Indeed, the aforementioned mixing and particle size reduction can be simultaneously carried out in a high energy mechanical mill, typically a mill such as a ball mill, media mill, or continuous mill such as DRAIS continuous mill. The particle size reduction can be carried out at room temperature, although the medium containing the components can heat up to higher temperatures during particle size reduction, e.g., milling. It is frequently desirable to simultaneously mix the components to form a slurry and reduce the solids particle size to to a size below 10 microns, and preferably to a size in the range of 1 to 5 microns. It is also preferable that simultaneous mixing and particle size reduction should be conducted under conditions such that no significant gelling occurs, while at the same time achieve a mixture having relatively high solids going into the processing steps that form the catalyst support and convert the mixture to a metal aluminate spinel composition.

Processing to Form Metal Aluminate Spinel

The mixture of (1), (2), and (3) above is then processed to form the metal aluminate spinel composition. This can be achieved through subjecting the mixture to a calcination temperature sufficient to produce metal aluminate spinel. This can be attained by calcination, typically carried out in a furnace (either continuous rotary type or stationary type) at a temperature in the range of 700 to 1300° C.

The mixture is generally fed to, or otherwise introduced to, a dryer prior to spinel formation, preferably a spray dryer, to remove the liquid medium, and to form a particulate having a size sufficient to serve as a support for FT catalysts. When utilizing a spray dryer, the inlet temperature of the dryer can be set at a temperature in the range of 100 to 400° C., and an outlet temperature in the range of 100 to 200° C. It is desirable that particles recovered from the spray dryer have a median particle size in the range of 20 to 100 microns.

The concentration or percentage of spinel in the aluminate spinel composition to some degree depends on the amounts of the metal compound capable of forming spinel phase relative to the amounts of the aluminum oxide added, as well as depends on the temperatures used to process the composition and amounts of other components added in the mixture prior to processing.

Once calcined, the support particles from this process typically have attrition resistance of less than 10 DI, more commonly, less than 5 DI. DI refers to the Davison Index, which is measured as follows:

The particle size of the calcined metal aluminate spinel composition is measured using a standard particle size analyzer such as a MALVERN mastersizer. The fraction of particles less than 20 microns is noted. A 7.0 gram sample of the same support is subjected to a 20 minute attrition in a standard hardened steel jet cup having a precision bored orifice. An air flow of 21 liters a minute is used. The particle size after attrition is measured again and the fraction less than 20 microns is noted. The Davison Index is calculated as follows $$\text{Davison Index} = \frac{\text{Fraction of particles less than 20 microns}}{\text{Fraction of particles less than 20 microns before attrition}}$$

It has also been shown that the process of this invention is capable of providing metal aluminate spinel supports of a DI of 5 or less, even at after calcining at a temperatures in the range of 700 to 1050° C., where heretofore such DIs were only seen for metal aluminate spinels after calcination temperatures greater than 1100° C. and approaching 1300° C.

It is also possible to measure attrition resistance using the method of ASTM 5757. The equipment used to measure attrition using this method consists of two main parts, one air feeding system and one reactor where the attrition takes place. Compressed air passes through a pressure regulator (5 bar) to a moisture chamber where the air is humidified to approximately 30% relative moisture. The amount of air is then adjusted in a mass flow controller. The humid air then enters the reactor through a sieve tray where the holes have a diameter of 0.4 mm. The holes induce a sonic velocity that creates "wear and tear" on the particles in the equipment. Equipment that carries out this test is known in the art. The test is typically run for five hours using a 50g test sample of particles sieved to greater than 40 microns.

After the particles are run through the reactor, they are passed to a separation chamber configured to separate particles smaller than 40 microns from the tested material. Particles are frequently routed to the separation chamber periodically during the test to measure fines smaller than 40 microns. The total fines collected during the test are then tallied at the end of the test and reported as a percentage of the starting amount. Suitable supports typically exhibit an attrition of less than 5% when using this test.

The composition of the product produced by the invention comprises metal aluminate spinel as can be evidenced by x-ray diffraction (XRD). The metal aluminate spinel peaks in a XRD pattern can usually be seen for compositions heated to at least 700° C., the temperature at which one typically first sees formation of the spinel. These peaks become sharper for compositions heated at higher temperatures along the range of 700 to 1300° C. The composition may also comprise an alumina phase, primarily alpha alumina, depending on the starting aluminum oxide, amount of metal from the metal compound capable of forming spinel phase, and the temperature at which the mixture is processed. Varying amounts of other transition phase alumina may also be present, again depending on the starting aluminum oxide, and the temperature at which the mixture is processed. In some embodiments, converting all reactive alumina in the starting aluminum oxide, or otherwise produced during processing, to alpha alumina may be desirable in order to reduce reactive surfaces capable of deactivating catalyst metal species added later when processing the support to a finished catalyst. These embodiments would therefore require calcination temperatures of at least 1000° C., the temperature above which gamma alumina transitions to alpha alumina. In other embodiments, it may be desirable to maintain some level of higher surface area and higher pore volume alumina, e.g., gamma alumina, in order to provide either more surface area for greater dispersion of catalytic species or more pore volume for higher loading of catalytically active metal species. One can therefore choose lower calcination temperatures to insure a larger amount of gamma, and at the same time produce an attrition resistant support at lower temperatures.

The invention therefore provides flexibility in selecting particular features for a support. For example, calcining the mixture to a temperature in the range of 900 to 1300° C. one attains an attrition resistance support comprising increasing amounts of alpha alumina as one approaches 1300° C., thereby likely increasing the life of the catalyst utilizing the support because there is less alumina surface capable of deactivating the catalytic metal. On the other hand, if one calcines the mixture to a temperature in the range of 700 to 900° C., one still attains an attrition resistant support, but with higher surface area and higher pore volume because the support will contain larger amounts of higher surface transition alumina (other than alpha alumina). Indeed, one may find it desirable to calcine the mixture at a temperature in the range of 950 to 1050° C. to attain a balance of features from both of the two earlier described embodiments.

FT Catalyst

Once the spinel catalyst support is formed, it can then be processed to include catalytic metal species suitable for catalysis of FT synthesis. Such metals include catalytic metal selected from among the Group 8 elements of the Periodic Table, such as iron (Fe), ruthenium (Ru), and osmium (Os); Group 9 elements, such as cobalt (Co), rhodium (Rh), and iridium (Ir); Group 10 elements, such as nickel (Ni), palladium (Pd), and platinum (Pt); and the metals molybdenum (Mo), rhenium (Re), and tungsten (W). The catalytic metal more preferably comprises cobalt, iron, ruthenium, nickel, or combinations thereof. The catalytic metal still more preferably comprises cobalt, iron, ruthenium, or combinations thereof. Most preferably, the catalytic metal comprises cobalt.

The amount of catalytic metal present in the catalyst may vary widely. When the catalytic metal is cobalt, the catalyst may have cobalt in an amount totaling from about 1% to about 50% by weight (as the metal) of total catalyst composition (catalytic metal, support, and any optional promoters), more preferably from about 5% to about 40% by weight, still more preferably from about 7 to about 37% by weight, and most preferably from about 10 to about 30% by weight. It will be understood that % indicates percent throughout the present specification. An iron containing catalyst however may comprise about 5 to about 75 wt. % iron, preferably from about 10 to about 60 wt. % iron, more preferably from about 20 to about 50 wt. % iron. Ruthenium catalyst can comprise about 0.01 to about 5 wt. % ruthenium, preferably from about 0.5 to about 4 wt. % ruthenium, more preferably from about 1 to about 3 wt. % ruthenium.

Catalysts prepared from the support of this invention may also comprises promoters. The promoter may vary according to the catalytic metal. A promoter can be an element that also, in an active form, has catalytic activity in the absence of the catalytic metal. Such an element is considered a promoter when it is present in the catalyst in a lesser wt. % than the catalytic metal, and it enhances the performance of the catalyst in FT synthesis. Suitable measures of the performance that may be enhanced include selectivity, activity, stability, lifetime, reducibility and resistance to potential poisoning by impurities such as sulfur, nitrogen, and oxygen.

Suitable promoters vary with the catalytic metal and can be selected from Groups 1-15 of the Periodic Table of the Elements. A promoter can be in elemental form. Alternatively, a promoter can be present in an oxide compound. Further, a promoter can be present in an alloy containing the catalytic metal. Except as otherwise specified herein, a promoter is preferably present in an amount to provide a weight ratio of elemental promoter:elemental catalytic metal of from about 0.00005:1 to about 0.5:1, preferably from about 0.0005:1 to about 0.25:1 (dry basis). When the promoter comprises a metal from Groups 7, 8, 9, and 10 of the Periodic Table such as rhenium, ruthenium, platinum, or palladium, the weight ratio of elemental promoter:elemental catalytic metal may be between about 0.00005:1 and about 0.05:1.

A catalyst comprising the support of this invention can be prepared using techniques known to those skilled in the art. Without limitation, examples of suitable methods include impregnating a catalyst material onto the support of the present invention, extruding the stabilized support together with the catalyst material to prepare catalyst extrudates, spray-drying the catalyst material and the support from a solution containing both, and/or precipitating the catalyst material onto a support. The supported catalysts may be used in the form of powders, particles, pellets, monoliths, honeycombs, packed beds, foams, and aerogels. The catalyst material can include any one or any combination of a catalytic metal, a precursor compound of a catalytic metal, a promoter, and a precursor compound of a promoter. The most preferred method of preparation may vary among those skilled in the art depending, for example, on the desired catalyst particle size. Those skilled in the art are able to select the most suitable method for a given set of requirements.

The process of this invention advantageously provides a support addressing several issues exhibited by prior supports and their methods of manufacture. It is appreciated that metal aluminate spinel does not react with catalytically active metal added to the support, which deactivates the catalyst and/or shortens its active life. The process of this invention adds additional benefits by providing a binding component and processing steps compatible with the process of making the spinel composition such that one overcomes the attrition problem associated with spinels that have not been calcined. The process further provides an attrition resistant spinel composition at more moderate temperatures and lower metal content compared to calcined attrition resistant spinel supports known in the art, which in turn reduces expense of manufacturing the support, while also providing the manufacturer a wider range of options in equipment the manufacturer uses. For example, if a manufacturer decides to calcine a metal aluminate spinel composition at high temperature to attain attrition resistance, the manufacturer has to select particular equipment capable of handling high temperatures. Highly calcined metal aluminate spinels unfavorably interact, e.g., adhere, with the processing equipment's metal surfaces (e.g., stainless steel) at very high temperatures.

To further illustrate the present invention and the advantages thereof, the following specific examples are given. The examples are given as specific illustrations of the claimed invention. It should be understood, however, that the invention is not limited to the specific details set forth in the examples.

All parts and percentages in the examples, as well as the remainder of the specification, which refers to solid compositions or concentrations, are by weight unless otherwise specified. However, all parts and percentages in the examples as well as the remainder of the specification referring to gas compositions are molar or by volume unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited.

EXAMPLES

Example 1

5% ZnO-Alumina

A Zn-aluminate support (5 wt % ZnO) was made as follows—A commercial pseudo boehmite such as Pural SB (Sasol) was first calcined to at 1000° F. to yield y-alumina. Separately, 28 lbs of DI water was weighed in a drum to which 12.25 lbs of aluminum nitrate (13.6% alumina) was added. About 15 lbs of calcined alumina described above was added to the mixture of water and Al-nitrate solution with constant agitation. Finally, 3.28 lbs of a commercially available Zn-nitrate solution (22.8% ZnO) was added to the above mixture. An intimate contact of alumina, binder and divalent metal nitrate (Zn-nitrate) was obtained in a high energy mechanical mill. The resulting milled particle size was around 1.5 microns. The milled slurry was dried in a spray dryer with an outlet temperature of around 250° F. to obtain microspheroidal support particles. A portion of the microspheres were calcined in an oven at 900° C. for 4 hours to obtain Zn-aluminate support.

Example 2

5% ZnO-Alumina

The Zn-aluminate support was prepared in the same manner as in Example 1, but the microspheres were calcined at 1000° C. for 4 hours to obtain Zn-aluminate.

Example 3

10% ZnO-Alumina

The Zn-aluminate support was prepared in the same manner as in Example 1, except that 6.6 lbs of Zn-nitrate was used in the synthesis. A portion of the microspheres were calcined in an oven at 900° C. for 4 hours to obtain Zn-aluminate support.

Example 4

10% ZnO-Alumina.

The Zn-aluminate support was prepared in the same manner as in Example 3, except that microspheres were calcined in an oven at 1000° C. for 4 hours to obtain Zn-aluminate support.

Example 5

10% ZnO-Alumina

The Zn-aluminate support was prepared in the same manner as in Example 3, calcined Catapal C alumina (Sasol) was used in the synthesis. A portion of the microspheres were calcined in an oven at 900° C. for 4 hours to obtain Zn-aluminate support.

Example 6

5% ZnO-Alumina

The Zn-aluminate support was prepared in the same manner as in Example 1, except that the particle size in the mechanical mill was 3.2 microns. A portion of the microspheres were calcined in an oven at 1000° C. for 4 hours to obtain Zn-aluminate support.

Example 7

5% ZnO-Alumina

The Zn-aluminate support was prepared in the same manner as in Example 5, except that the particle size in the mechanical mill was 3.2 microns. A portion of the microspheres were calcined in an oven at 1000° C. for 4 hours to obtain Zn-aluminate support.

Example 8

10% ZnO-Alumina

The Zn-aluminate support was prepared in the same manner as in Example 3, calcined Pural TM-70 alumina (Sasol) was used in the synthesis. A portion of the microspheres were calcined in an oven at 1000° C. for 4 hours to obtain Zn-aluminate support.

Example 9

10% ZnO-Alumina

The Zn-aluminate support was prepared in the same manner as in Example 3, calcined Catapal 14HT alumina (Sasol) was used in the synthesis. A portion of the microspheres were calcined in an oven at 1000° C. for 4 hours to obtain Zn-aluminate support.

Example 10

5% NiO-Alumina

A Ni-aluminate support was prepared in the same manner as in Example 1, using calcined Pural SB (Sasol) alumina, but instead of adding Zn-nitrate, 3 lbs of Ni-nitrate crystals (GFS chemicals; 25.7% NiO) was added to slurry of water and aluminum nitrate binder. A portion of the microspheres were calcined at 600° C. for 2 hours.

Example 11

5% NiO-Alumina

A portion of the Ni-aluminate support made in Example 10 was calcined at 1000° C. for 2 hours.

Example 12

Each of the catalysts prepared above was then measured for pore volume and surface area. The specific surface area and pore volume results reported below were measured using standard BET method using $N_2$ as a probe molecule. The detailed procedure to measure the surface area and pore volume is described in the ASTM method D-3663-03.

TABLE 1

| Example No | Alumina | Oxide of Metal Capable of Forming Spinel | Oxide of Metal Capable of Forming Spinel % (by weight) | Attrition (%) | T (calc) ° C. | BET SA (m²/g) | PV (cc/g) |
|---|---|---|---|---|---|---|---|
| 1 | Pural SB | ZnO | 4.5% | <1.0 | 900 | 99 | 0.20 |
| 2 | Pural SB | ZnO | 4.6% | <1.0 | 1000 | 18 | 0.15 |
| 3 | Pural SB | ZnO | 7.3% | <1.0 | 900 | 94 | 0.20 |
| 4 | Pural SB | ZnO | 7.60% | <1.0 | 1000 | 22 | 0.13 |
| 5 | Catapal C | ZnO | 7.50% | <1.0 | 900 | 89 | 0.20 |
| 6 | Pural SB | ZnO | 4.3 | <1.0 | 1000 | 37 | 0.15 |
| 7 | Catapal C | ZnO | 4.7 | <1.0 | 1000 | 50 | 0.18 |
| 8 | Pural TM-70 | ZnO | 7.5 | <1.0 | 1000 | 30 | 0.24 |
| 9 | Catapal 14HT | ZnO | 7.7 | 4.5 | 1000 | 59 | 0.31 |
| 10 | Pural SB | NiO | 4.5 | <1.0 | 600 | 176 | 0.27 |
| 11 | Pural SB | NiO | 4.5 | <1.0 | 1000 | 88 | 0.23 |

What is claimed is:

1. A process of manufacturing a metal aluminate spinel composition, the process comprising;
   (a) combining aluminum oxide, metal compound capable of forming spinel phase, and soluble compound of a trivalent aluminum wherein the aluminum oxide is selected from the group consisting of gamma alumina, delta alumina, theta alumina, eta alumina, rho-alumina, and mixtures thereof;
   (b) mixing the combination of (a) under conditions sufficient to form a slurry comprising the combination; and
   (c) processing the mixture of (b) under conditions sufficient to form metal aluminate spinel composition.

2. A process according to claim 1, wherein the aluminum oxide comprises gamma alumina.

3. A process according to claim 2, wherein the gamma alumina is prepared by heating boehmite alumina at a temperature sufficient to convert boehmite alumina to gamma alumina.

4. A process according to claim 3 wherein the boehmite alumina is heated to a temperature in the range of 400 to 700° C.

5. A process according to claim 1, wherein the metal compound capable of forming spinel phase is a salt of a divalent metal.

6. A process according to claim 5, wherein the divalent metal is selected from the group consisting of nickel, copper, zinc, cobalt, magnesium and mixtures thereof.

7. A process according to claim 5, wherein the divalent metal is selected from the group consisting of zinc, nickel, and magnesium.

8. A process according to claim 1, wherein the soluble compound of trivalent aluminum is selected from the group consisting of aluminum nitrate, aluminum chlorohydrol, aluminum sulfate, aluminum chloride, aluminum acetate, aluminum formate, and mixtures thereof.

9. A process according to claim 1, wherein the mixing in (b) comprises intimately mixing the components combined in (a).

10. A process according to claim 9, wherein the mixing in (b) further comprises reducing particle size of solids in the mixture to a median particle size that is less than ten microns.

11. A process according to claim 10 wherein the mixing in (b) is without significant gelling.

12. A process according to claim 10 wherein the mixing in (b) is conducted in a mill.

13. A process according to claim 12 wherein the mixing in (b) further comprises reducing particle size of solids in the mixture to a median particle size in the range of 1 to 5 microns.

14. A process according to claim 1, wherein (c) comprises drying the mixture from (b) at a temperature in the range of 100 to 400° C. to form particles having a median particle size in the range of 20 to 100 microns and subsequently calcining the particles.

15. A process according to claim 14, wherein (c) comprises drying the mixture from (b) in a spray drier.

16. A process according to claim 14 wherein the processing in (c) comprises calcining the mixture from (b) at a temperature in the range of 700 to 1300° C.

17. A process according to claim 16 wherein the processing in (c) comprises calcining the mixture from (b) at a temperature in the range of 700 to 1050° C.

18. A process according to claim 16, wherein product from calcining further comprises alpha alumina.

19. A process according to claim 1, wherein (a) comprises combining (1) the selected aluminum oxide or mixtures thereof; (2) the metal capable of forming spinel compounds comprising salt of a metal, or mixture of metals, other than aluminum; and (3) soluble compound of trivalent Al selected from the group consisting of aluminum nitrate, aluminum chlorohydrol, aluminum sulfate, aluminum chloride, and mixture mixtures thereof; (b) comprises reducing the particle size of the solids in the mixture to a median particle size of less than ten microns; and (c) comprises drying the mixture of (b) at a temperature in the range of 100 to 400° C., and calcining the dried mixture at a temperature in the range of 700 to 1300° C.

20. A process according to claim 19, wherein (b) comprises reducing the particle size of solids in the mixture to a median particle size in the range of 1 to 5 microns, (c) comprises drying the mixture of (b) at a temperature in the range of 100 to 400° C., and calcining the dried mixture at a temperature in the range of 700 to 1050° C.

21. A process according to claim 20, wherein (a) comprises combining gamma alumina, a metal nitrate salt, and aluminum nitrate.

22. A process according to claim 19, wherein (c) comprises drying the mixture from (b) at a temperature in the range of 100 to 400° C. to form particles having a median particle size in the range of 20 to 100 microns prior to calcining.

* * * * *